(12) United States Patent
Chung et al.

(10) Patent No.: US 7,469,318 B2
(45) Date of Patent: Dec. 23, 2008

(54) SYSTEM BUS STRUCTURE FOR LARGE L2 CACHE ARRAY TOPOLOGY WITH DIFFERENT LATENCY DOMAINS

(75) Inventors: Vicente Enrique Chung, Austin, TX (US); Guy Lynn Guthrie, Austin, TX (US); William John Starke, Round Rock, TX (US); Jeffrey Adam Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 733 days.

(21) Appl. No.: 11/054,925

(22) Filed: Feb. 10, 2005

(65) Prior Publication Data

US 2006/0179222 A1 Aug. 10, 2006

(51) Int. Cl.
*G06F 12/00* (2006.01)
(52) U.S. Cl. .................. 711/129; 711/3; 711/119; 711/127; 711/144; 711/157
(58) Field of Classification Search ................ None
See application file for complete search history.

(56) References Cited

U.S. PATENT DOCUMENTS

| 5,896,548 | A | 4/1999 | Ofek |
| 6,408,362 | B1 | 6/2002 | Arimilli |
| 6,442,653 | B1 | 8/2002 | Arimilli |
| 6,769,081 | B1 | 7/2004 | Parulkar |
| 6,859,862 | B1 | 2/2005 | Liao |
| 2002/0065988 | A1 * | 5/2002 | Lasserre et al. ............ 711/122 |
| 2004/0215888 | A1 | 10/2004 | Arimilli |
| 2005/0172091 | A1 | 8/2005 | Rotithor |

* cited by examiner

*Primary Examiner*—Reginald G. Bragdon
*Assistant Examiner*—Shawn X Gu
(74) *Attorney, Agent, or Firm*—Diana R. Gerhardt; Jack V. Musgrove

(57) ABSTRACT

A cache memory which loads two memory values into two cache lines by receiving separate portions of a first requested memory value from a first data bus over a first time span of successive clock cycles and receiving separate portions of a second requested memory value from a second data bus over a second time span of successive clock cycles which overlaps with the first time span. In the illustrative embodiment a first input line is used for loading both a first byte array of the first cache line and a first byte array of the second cache line, a second input line is used for loading both a second byte array of the first cache line and a second byte array of the second cache line, and the transmission of the separate portions of the first and second memory values is interleaved between the first and second data busses. The first data bus can be one of a plurality of data busses in a first data bus set, and the second data bus can be one of a plurality of data busses in a second data bus set. Two address busses (one for each data bus set) are used to receive successive address tags that identify which portions of the requested memory values are being received from each data bus set. For example, the requested memory values may be 32 bytes each, and the separate portions of the requested memory values are received over four successive cycles with an 8-byte portion of each value received each cycle. The cache lines are spread across different cache sectors of the cache memory, wherein the cache sectors have different output latencies, and the separate portions of a given requested memory value are loaded sequentially into the corresponding cache sectors based on their respective output latencies. Merge flow circuits responsive to the cache controller are used to receive the portions of a requested memory value and input those bytes into the cache sector.

6 Claims, 12 Drawing Sheets

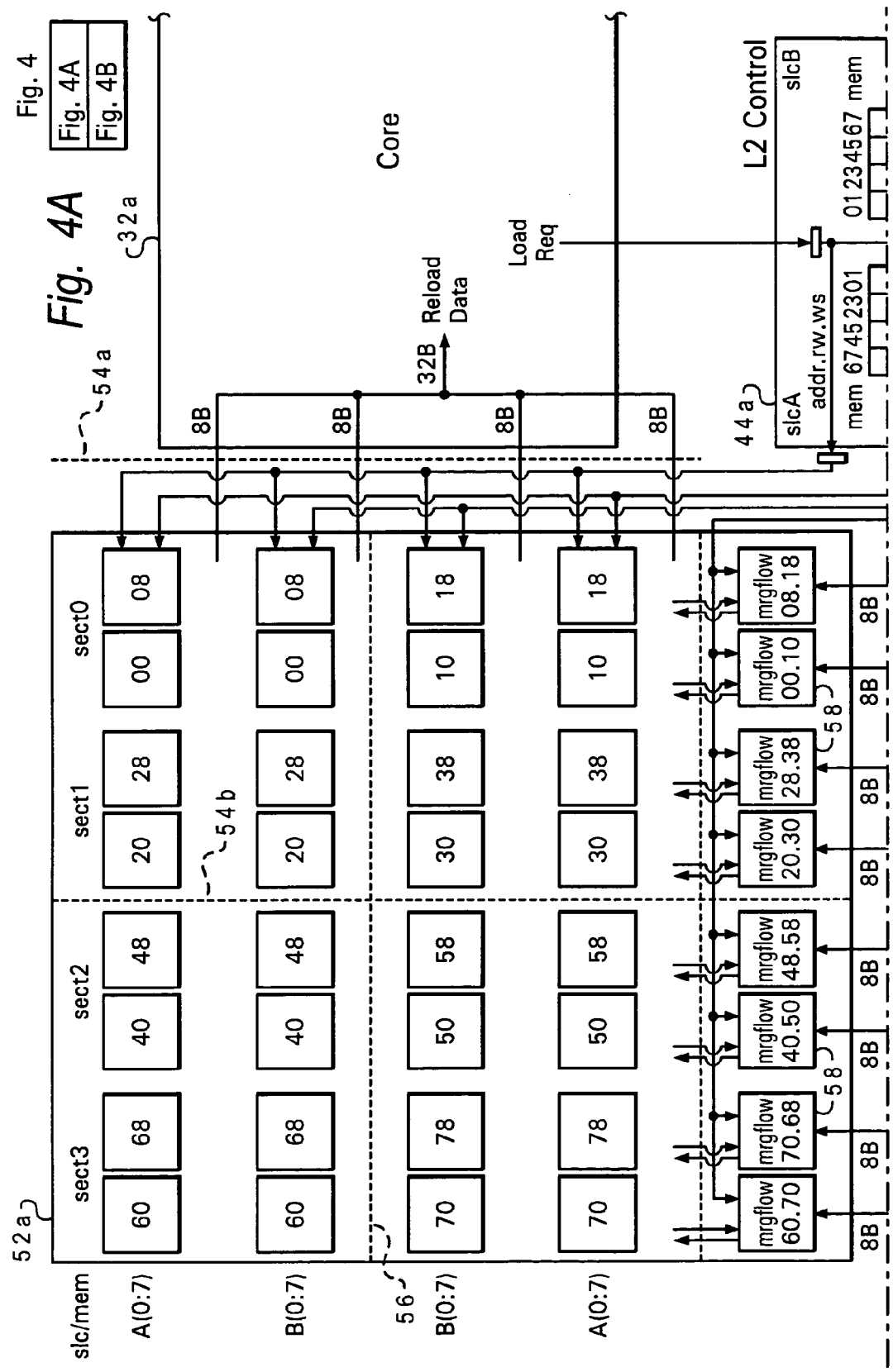

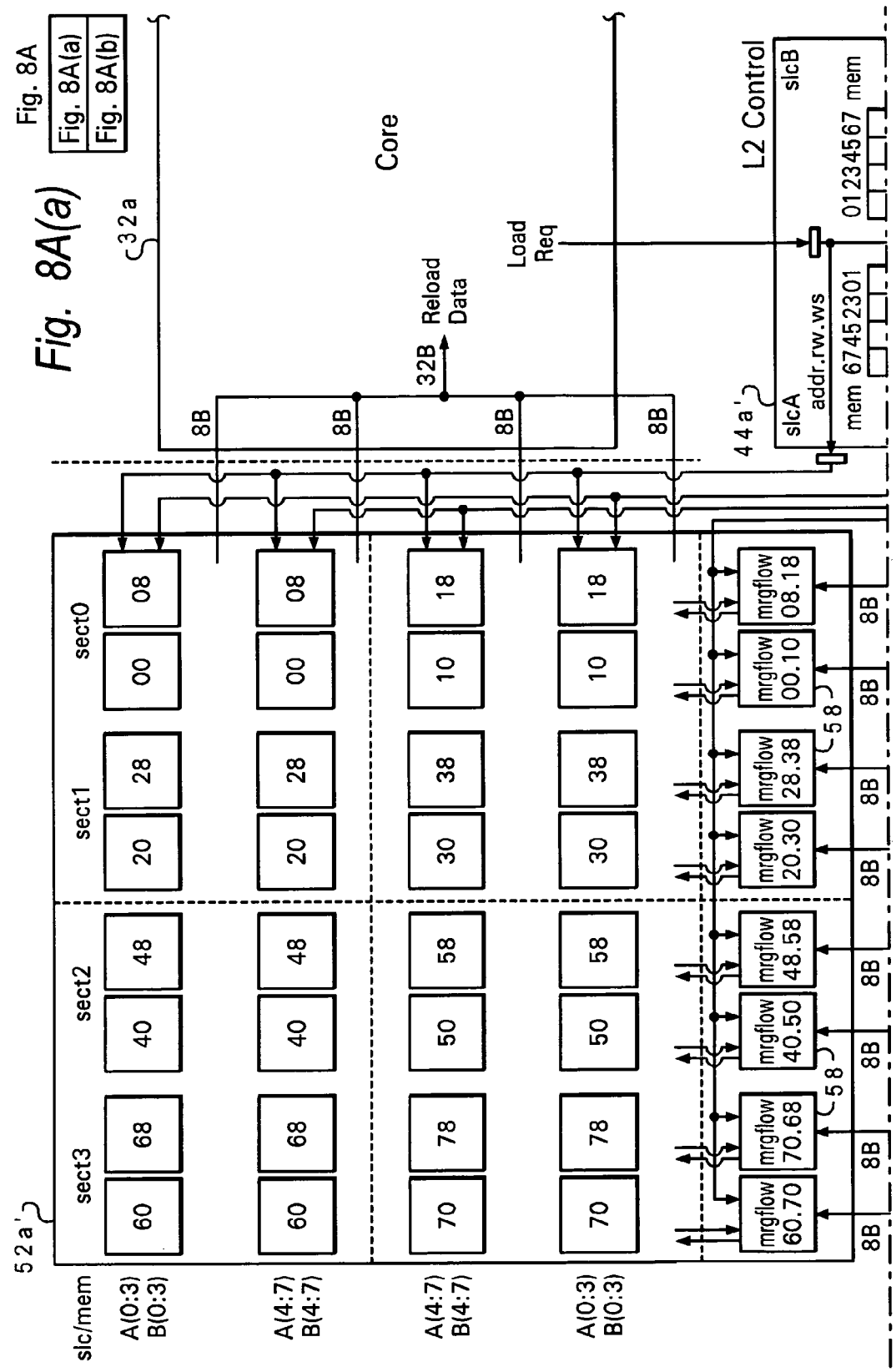

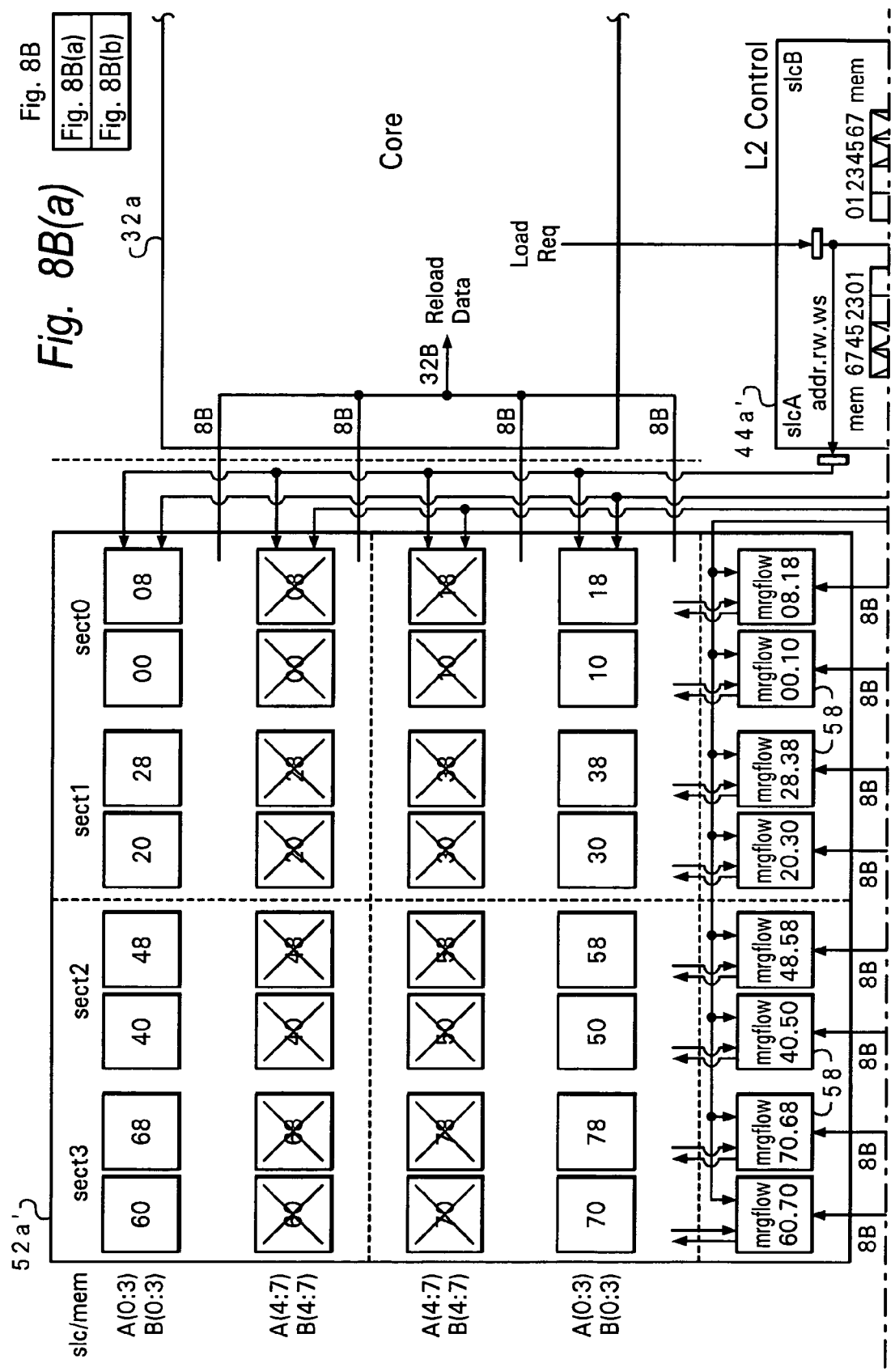

SYSTEM BUS STRUCTURE FOR LARGE L2 CACHE ARRAY TOPOLOGY WITH DIFFERENT LATENCY DOMAINS

CROSS-REFERENCE TO RELATED APPLICATIONS

This application is related to U.S. patent application Ser. No. 11/054,924 filed Feb. 10, 2005, U.S. patent application Ser. No. 11/054,930 filed Feb. 10, 2005 now U.S. Pat. No. 7,366,841, and U.S. patent application Ser. No. 11/055,262 filed Feb. 10, 2005 now U.S. Pat. No. 7,308,537, each of which is hereby incorporated.

BACKGROUND OF THE INVENTION

1. Field of the Invention

The present invention generally relates to computer systems, and more particularly to a memory hierarchy for a computer system that includes large cache structures having different latencies across the cache arrays.

2. Description of the Related Art

The basic structure of a conventional computer system includes one or more processing units which are connected to various peripheral devices (including input/output devices such as a display monitor, keyboard, and permanent storage device), a memory device such as random access memory (RAM) that is used by the processing units to carry out program instructions and store operand data, and firmware which seeks out and loads an operating system from one of the peripherals (usually the permanent memory device) whenever the computer is first turned on. The processing units typically communicate with the peripheral devices by means of a generalized interconnect or bus. A computer system may have many additional components such as various adapters or controllers, and serial, parallel and universal bus ports for connection to, e.g., modems, printers or network interfaces.

In a symmetric multi-processor (SMP) computer, all of the processing units are generally identical, that is, they all use a common set or subset of instructions and protocols to operate, and generally have the same architecture. A typical architecture includes a processor core having a plurality of registers and execution units, which carry out program instructions in order to operate the computer. The processing unit can also have one or more caches, such as an instruction cache and a data cache, which are implemented using high speed memory devices. Caches are commonly used to temporarily store values that might be repeatedly accessed by a processor, in order to speed up performance by avoiding the longer step of loading the values from a main memory device. These caches are referred to as "on-board" when they are integrally packaged with the processor core on a single integrated chip.

A processing unit can include additional caches, such as a level 2 (L2) cache which may support on-board (level 1) instruction and data caches. An L2 cache acts as an intermediary between the main (system) memory and the on-board caches, and can store a much larger amount of information than the on-board caches, but at a longer access penalty.

A cache has many blocks which individually store the various instruction and data values. The blocks in any cache are divided into groups of blocks called sets or congruence classes. A set is the collection of cache blocks that a given memory block can reside in. For any given memory block, there is a unique set in the cache that the block can be mapped into, according to preset mapping functions. The number of blocks in a set is referred to as the associativity of the cache, e.g. 2-way set associative means that for any given memory block there are two blocks in the cache that the memory block can be mapped into; however, several different blocks in main memory can be mapped to any given set. A 1-way set associative cache is direct mapped, that is, there is only one cache block that can contain a particular memory block. A cache is said to be fully associative if a memory block can occupy any cache block, i.e., there is one congruence class, and the address tag is the full address of the memory block.

An exemplary cache line (block) includes an address tag field, a state bit field, an inclusivity bit field, and a value field for storing the actual instruction or data. The state bit field and inclusivity bit fields are used to maintain cache coherency in a multiprocessor computer system (to indicate the validity of the value stored in the cache). The address tag is usually a subset of the full address of the corresponding memory block. A compare match of an incoming address with one of the tags within the address tag field indicates a cache "hit." The collection of all of the address tags in a cache (and sometimes the state bit and inclusivity bit fields) is referred to as a directory, and the collection of all of the value fields is the cache entry array.

When all of the blocks in a congruence class for a given cache are full and that cache receives a request, whether a "read" or "write," to a memory location that maps into the full congruence class, the cache must make one of the blocks in that class available for the new operation. The cache chooses a block by one of a number of means known to those skilled in the art (least recently used (LRU), random, pseudo-LRU, etc.). If the data in the chosen block has been modified, that data is written to the next lowest level in the memory hierarchy which may be another cache (in the case of the L1 or on-board cache) or main memory (in the case of an L2 cache). By the principle of inclusion, the lower level of the hierarchy will already have a block available to hold the written modified data. If the data in the chosen block has not been modified, the value in that block is simply abandoned and not written to the next lowest level in the hierarchy. This process of freeing up a block from one level of the cache hierarchy is known as an eviction. At the end of this process, the cache no longer holds a copy of the evicted block. When a device such as the CPU or system bus needs to know if a particular cache line is located in a given cache, it can perform a "snoop" request to see if the address is in the directory for that cache.

As microprocessor computing power grows, it becomes more critical for caches to correspondingly grow in size in order to avoid processing bottlenecks that arise from memory latencies. However, large cache structures can introduce or exacerbate other problems, such as bandwidth and connectivity. Some high-performance computer systems address these issues by dividing the cache array and directory into two or more slices, and allowing multiple access/command ports. One example of such a sliced cache structure is shown in FIG. 1, which depicts a processing unit 10 having a processor core 12 with on-board instruction and data caches, and an L2 cache entry array which is divided into two slices 14a and 14b (slice A and slice B). The L2 cache controller is divided into two corresponding slices 16a, 16b each having its own directory 18a, 18b. When processor core 12 issues a load request, the address tag for the request is sent to one of the directory slices 18a, 18b, based on a hash scheme that uses an address bit to direct the request to a given slice (e.g., addr(56)=0 means slice A). The L2 directory slice performs the address comparisons and upon detecting a load hit activates a select signal that controls the output of cache array slices 14a and 14b. The "addr.rw.ws" signal includes information regarding the congruence class for the requested memory block, whether the operation is a read or write, and the write set.

Each cache array slice 14a, 14b is further divided into four sectors, that is, a given cache line is distributed across all four sectors of a slice. In this example, each cache line is 128 bytes longs, and the digit pairs in each sector represent the beginning byte number (in hexadecimal) for an 8-byte word of the line, e.g., "00" refers to the first 8-byte word in the cache line (bytes 00, 01, 02, 03, 04, 05, 06 and 07), and "08" refers to the second 8-byte word in the cache line (bytes 08, 09, 0A, 0B, 0C, 0D, 0E and 0F). Thus, each sector contains 32 noncontiguous bytes of a given cache line. All of the sectors are in a single latency domain but only 32 bytes are output in a given cycle, so it takes four cycles to output a complete 128-byte cache line, with the entire cache array (all sectors) powered up during each of the four cycles.

Each L2 controller slice 16a, 16b has its own read claim (RC), cast out (CO) and snoop (SN) machines. Each controller slice further has its own directory arbiter 20a, 20b which handles conflicts between these machines and load requests from the processor core. The directory arbiters are connected respectively to cache arbiters 22a, 22b which control the flow of merge data coming from elsewhere in the memory hierarchy (e.g., system memory) using separate command ports. Merge flow logic in each cache slice receives 32 bytes in a given cycle from four 8-byte fabric busses that are connected to system memory and various peripheral devices.

While the use of sliced cache arrays can improve cache bandwidth, there are still serious problems with power consumption, wiring topology, differential latencies, and recoverability, especially when the design scales to larger cache sizes. As designs grow the cache size by placing larger numbers of cache array macros, the latency to the farthest array becomes multiple clock cycles away from the core compared to the closest cache array. Thus, the prior art mechanism wherein all arrays' access times are in the same clock cycle becomes temporally wasteful, because the close arrays must be slowed to match the farthest arrays' access time. Although transmission speed can be increased by providing special wiring (wider/faster), such wiring increases the expense of the design and uses valuable wiring resources, and these problems are compounded in designs requiring large busses for two cache slices. Even in the case of a load hit, there can still be a significant delay in accessing and transmitting the requested cache line, due to the physical layout of the cache and processor core. It would, therefore, be desirable to devise an improved cache structure which could reduce latencies associated with a sizeable growth of the cache, particularly latencies arising from load hits. It would be further advantageous if the cache structure could maintain superior directory bandwidth, and still afford a high degree of recoverability in the case of a defect in the array.

SUMMARY OF THE INVENTION

It is therefore one object of the present invention to provide an improved cache memory for a computer system.

It is another object of the present invention to provide such a cache memory which is highly scalable to allow large cache arrays without significantly increasing cache latency.

It is yet another object of the present invention to provide a cache array topology for large cache structures which takes into consideration different latencies associated with different cache sectors.

The foregoing objects are achieved in a method of operating a cache memory by determining that the cache memory does not have currently valid entries corresponding to first and second requested memory values, and then loading the first and second requested memory values respectively into first and second cache lines of the cache memory by receiving separate portions of the first requested memory value from a first data bus over a first time span of successive clock cycles and receiving separate portions of the second requested memory value from a second data bus over a second time span of successive clock cycles which overlaps with the first time span. In the illustrative embodiment a first input line is used for loading both a first byte array of the first cache line and a first byte array of the second cache line, a second input line is used for loading both a second byte array of the first cache line and a second byte array of the second cache line, and the transmission of the separate portions of the first and second memory values is interleaved between the first and second data busses. The first data bus can be one of a plurality of data busses in a first data bus set, and the second data bus can be one of a plurality of data busses in a second data bus set. Two address busses (one for each data bus set) can be used to receive successive address tags that identify which portions of the requested memory values are being received from each data bus set. For example, the requested memory values may be 32 bytes each, and the separate portions of the requested memory values are received over four successive cycles with an 8-byte portion of each value received each cycle. The cache lines are spread across different cache sectors of the cache memory, wherein each cache sector may arrive at various return latencies, and the separate portions of a given requested memory value are loaded sequentially into the corresponding cache sectors based on their respective return latencies. Merge flow circuits responsive to the cache controller are used to receive the portions of a requested memory value and input those bytes into the cache sector.

The above as well as additional objectives, features, and advantages of the present invention will become apparent in the following detailed written description.

BRIEF DESCRIPTION OF THE DRAWINGS

The present invention may be better understood, and its numerous objects, features, and advantages made apparent to those skilled in the art by referencing the accompanying drawings.

DESCRIPTION OF THE PREFERRED EMBODIMENT(S)

Figure 1:
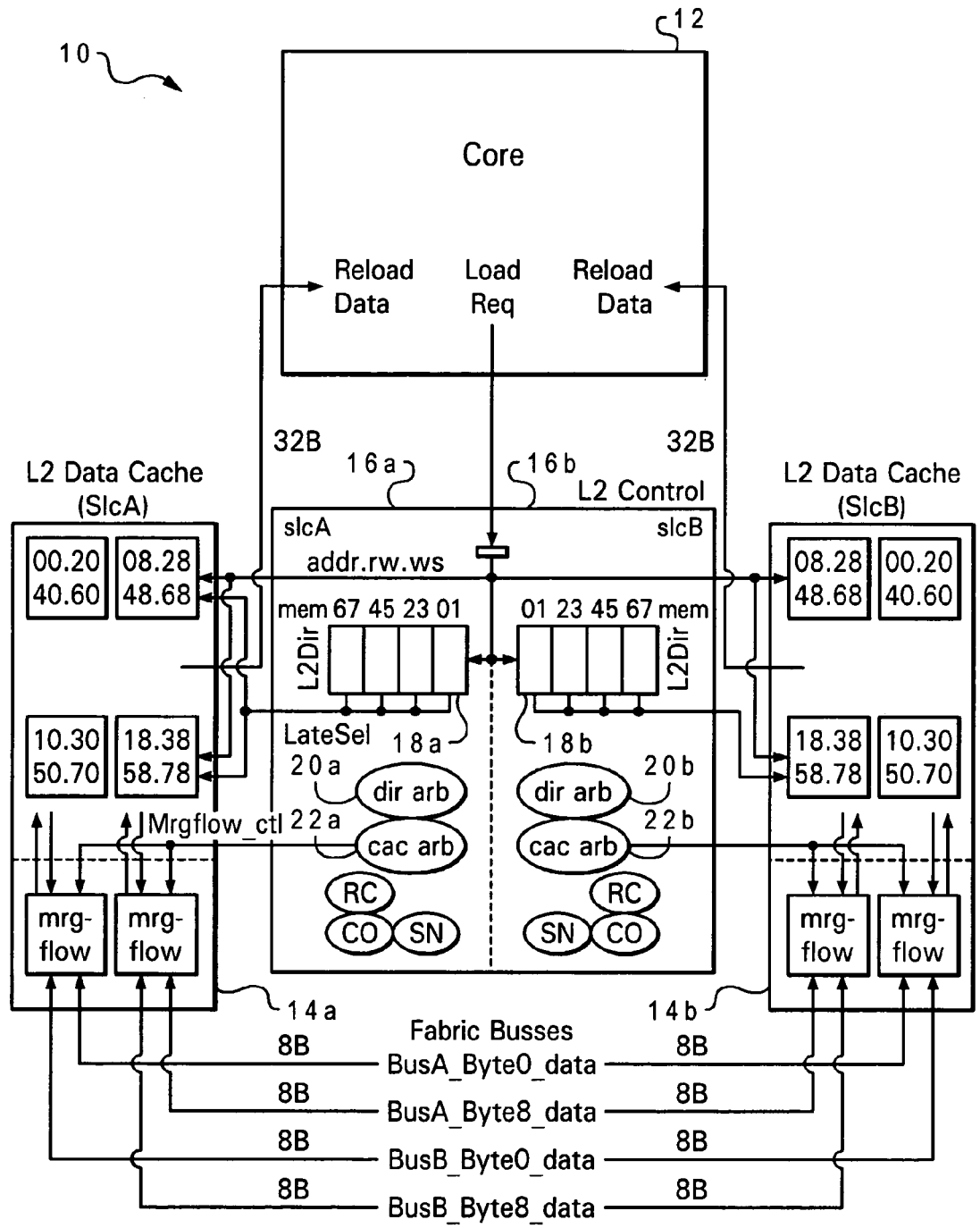
FIG. 1 is a block diagram of a conventional processing unit for a computer system, depicting a second level (L2) cache memory having a sliced directory and array structure.
Figure 2:
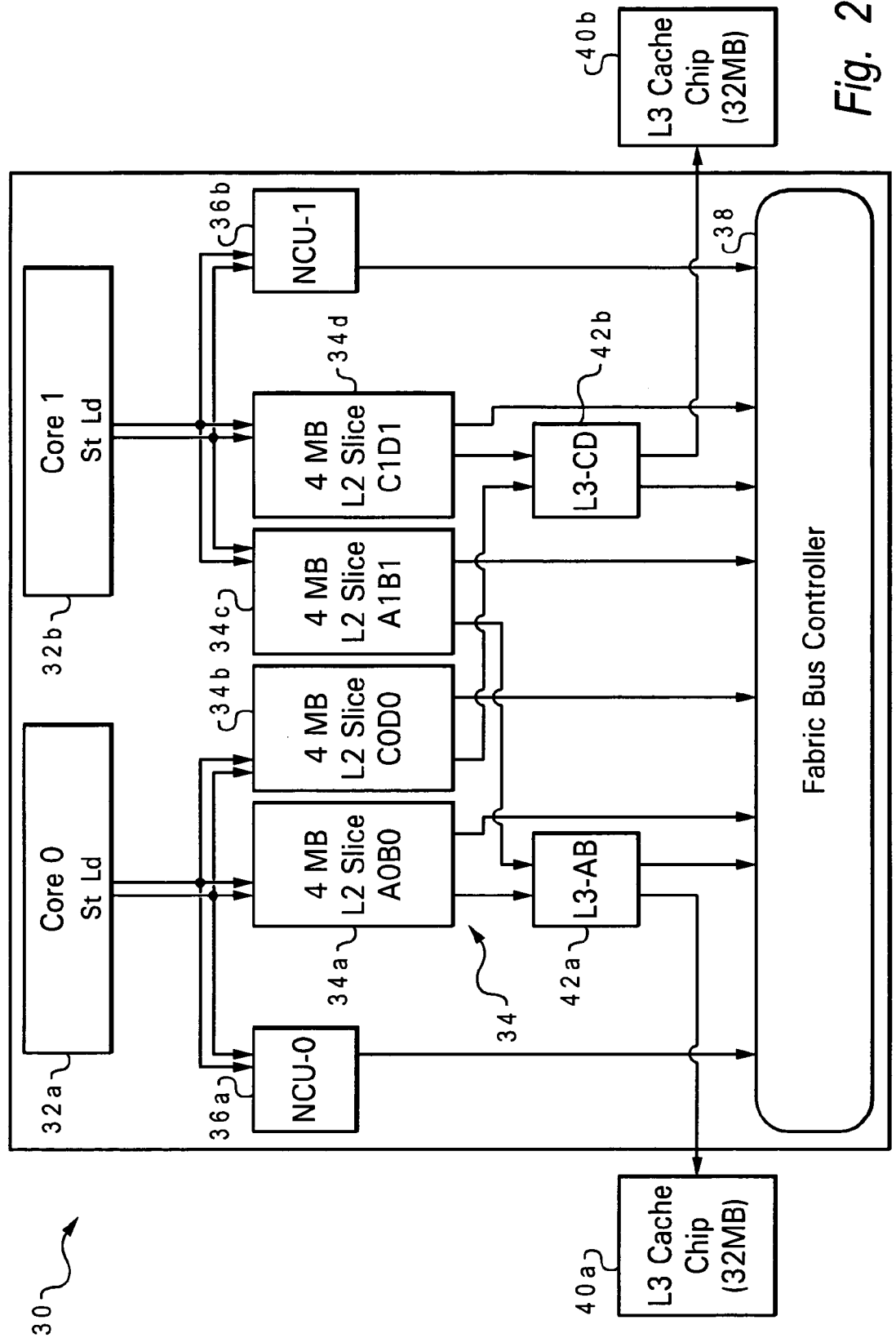
FIG. 2 is a block diagram of one embodiment of a processing unit constructed in accordance with the present invention, which includes two processing cores and four L2 cache slice pairs, wherein each processing core has exclusive access to four of the L2 cache slices.

With reference now to the figures, and in particular with reference to FIG. 2, there is depicted one embodiment 30 of a processing unit constructed in accordance with the present invention. Processing unit 30 is generally comprised of two processor cores 32a, 32b, a sliced level 2 (L2 ) cache 34, two non-cacheable control units (NCUs) 36a and 36b (one per core), a fabric bus controller (FBC) 38, and two level 3 (L3) caches 40a, 40b with associated L3 controllers 42a, 42b. Each processing core 32a, 32b includes its own store-through L1 cache (separate program instruction and operand data caches). More than two processing cores may be provided for a single processing unit.

Processing unit 30 may be part of a larger computer system which includes various conventional elements (not shown), such as firmware or read-only memory (ROM) and main or random-access memory (RAM) coupled to a peripheral component interconnect (PCI) local bus using a PCI host bridge. The PCI host bridge can provide a low latency path through which processors 32a and 32b may access PCI devices mapped anywhere within bus memory or I/O address spaces. The PCI host bridge also provides a high bandwidth path to allow the PCI devices to access the main memory. Such PCI devices might include a local area network (LAN) adapter, a small computer system interface (SCSI) adapter providing access to a permanent storage device (e.g., a hard disk drive which stores an operating system and program files), an expansion bus bridge with user input devices such as a keyboard and graphical pointer (mouse), an audio adapter, or a graphics adapter. Service processors (not shown) can be connected to processor cores 32a, 32b via a JTAG interface or other external service port, and a processor bridge (not shown) can optionally be used to interconnect additional processor groups.

The L2 cache portion 34 of the processing subsystem is divided into four directory slice pairs 34a, 34b, 34c and 34d (for a total of 8 slices: A0, B0, C0, D0, A1, B1, C1, D1). Each slice pair has four megabytes (MB) of memory, and each processor has exclusive use of four of the L2 cache slices, i.e., the L2 cache is 8 MB of private memory per core. In the depicted embodiment, core 32a uses slice pairs 34a and 34b, and core 32b uses slice pairs 34c and 34d. The individual slices are selected by an address hashing algorithm residing in cores 32a, 32b. The same hashing algorithm is used by FBC 38 to route snoop traffic to the L2 slices. For example, bits 55 and 56 of the address can be decoded to route to slice A when addr(55:56)=00, to slice B when addr(55:56)=01, to slice C when addr(55:56)=10, and to slice D when addr(55:56)=11.

Each private 4 MB cache is logically partitioned to have two directory slices and two cache array slices (e.g., A and B). The 4 MB data cache is further partitioned into four domains or sectors (sect0,1,2,3) where the first 32 bytes of a cache line go in sect0 and the last 32 bytes of the cache line go in sect3. These sectors are oriented such that all four sectors sect0,1, 2,3 (collectively referred to as quadrant 0) are physically located together in a corner of the chip, as explained further below. In this example, the cache line size is 128 bytes, L2 cache 34 is fully inclusive of the L1 data and instruction caches, and is 8-way set associative. The cache array data and directory array are protected by error correction code (ECC) having single-bit correction and double-bit detection (SBC/DBD) capability. A least-recently used (LRU) algorithm is provided and may be enhanced as explained further below.

L2 slices 34a, 34b, 34c and 34d generally handle all cacheable load/store instructions, data and instruction prefetches, zero-out instructions (e.g., the "DCBZ" PowerPC™ instruction), and synchronization instructions. NCUs 36a and 36b handle all other communication with the processor cores, such as cache-inhibited load/store instructions and cache operations (excluding zero-out and similar instructions).

Figure 3:
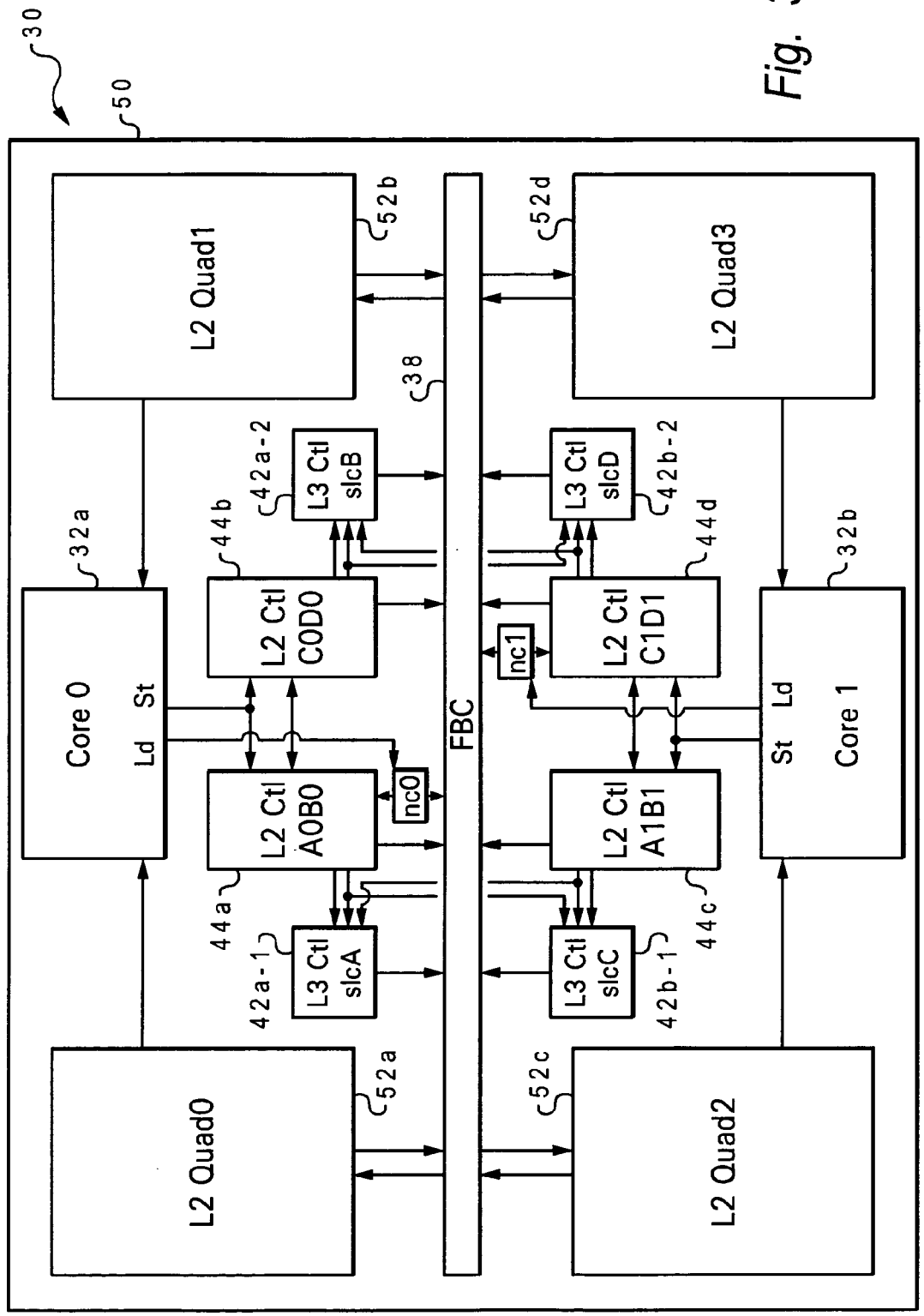
FIG. 3 is a plan view of a preferred physical layout of the components of the processing unit of FIG. 2 as assembled on an integrated circuit chip.

FIG. 3 illustrates a general physical layout of the components of processing unit 30 as assembled on an integrated circuit (IC) chip 50 or other substrate. FBC 38 extends horizontally along the central portion of IC chip 50, with core 32a at the central upper portion and core 32b opposite the FBC at the central lower portion. Two L2 controllers 44a, 44b are located between core 32a and FBC 38 (to service core 32a), and two more L2 controllers 44c, 44d are located between core 32b and FBC 38 (to service core 32b). Although the L3 cache array is not included as part of the processing unit assembly, the L3 controllers may be included. In this implementation, L3 controller 42a-1 interconnects L2 controller 44a with L3 cache 40a; L3 controller 42a-2 interconnects L2 controller 44b with L3 cache 40a; L3 controller 42b-1 interconnects L2 controller 44c with L3 cache 40b; and L3 controller 42b-2 interconnects L2 controller 44d with L3 cache 40b.

The L2 cache array is spread out over four separate quadrants 52a, 52b, 52c and 52d. Each of these quadrants contains the sectors as explained above, e.g., L2 quadrant 52a (quad0) contains all four sectors sect0,1,2,3 of a given cache line in L2 slice A0, and also contains all four sectors sect0,1,2,3 of a given cache line in L2 slice B0.

Figure 4B:
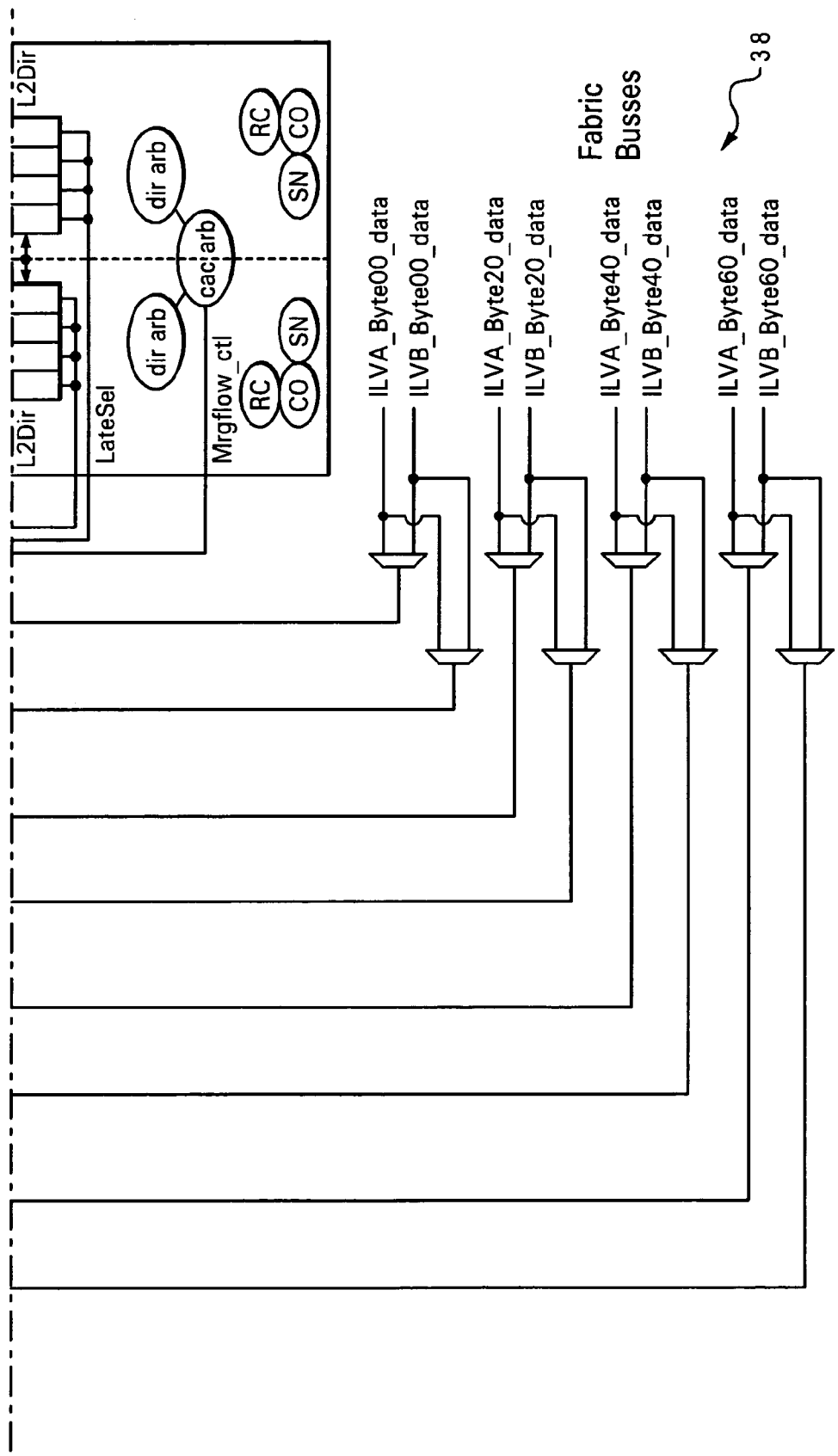
FIG. 4 is a block diagram of an L2 cache memory having a sliced directory and unified cache array, constructed in accordance with one embodiment of the present invention concerned with power conservation.

Referring now to FIG. 4, one embodiment of L2 quadrant 52a is shown in greater detail (L2 quadrants 52b, 52c and 52d have the same corresponding structure for the other cache slices C0D0, A1B1, and C1D1). L2 quadrant 52a has four horizontal cache ways or rows, with each row containing four sectors (each sector is 16 contiguous bytes arranged in two 4×2-byte arrays). A given row therefore contains 64 bytes, or half of a cache line. In the embodiment of FIG. 4, the top and bottom rows together make up cache slice A, and the middle two rows together make up cache slice B. The starting sector for a cache line is the uppermost right array pair together with the lower right array pair (e.g., for cache slice A, the arrays at the far right of the top row and the far right of the bottom row). The sectors for a cache line progress in order from right to left.

The sectors of L2 quadrant 52a are arranged in this manner to facilitate pipelining of the cache output to core 32a when the cache is found to contain a currently valid value requested by the core (a load hit). A load request sent from core 32a is received by L2 controller 44a, which has a sliced directory. The load address is delivered to either the left (A) or right (B) directory slice based on the setting of a designated bit in the address field (e.g., addr(56)), and is also delivered to a latch that feeds the address to all rows of L2 quadrant 52a. If directory slice A finds a valid matching address, it sends an enable signal (LateSel) to the slice A cache (the top and bottom rows), and if directory slice B finds a valid matching address, it sends an enable signal to the slice B cache (the middle two rows). Each L2 directory slice has its own read claim (RC), cast out (CO) and snoop (SN) machines. While the sliced directory effectively has two separate ports, the cache is unified with a single access/command port and a single cache arbiter. The directory arbiters handle access for the RC, CO and SN machines within their respective slices, while the unified cache arbiter handles requests for cache access by the RC, CO and SN machines across both slices.

The directory arbiter and cache arbiter also coordinate their access for certain core requests where the directory and cache need access together.

As the address and control information propagates across the cache domains from right to left, cache controller 44a selectively enables the appropriate cache domains for the read access in successive clock cycles based on their latency. As the cache arrays are read, the data propagates back from right to left over the reload data bus back to the core 32a (multiplexers are used to select between the A and B slices for the output). The horizontal (left/right) boundary 54b between sectors 1 and 2 thus represents a cycle boundary in this embodiment. The horizontal (left/right) boundary 54a between sector 0 and the core represents another cycle boundary.

The cache arbiter sends only one control signal per cycle, but it can schedule different tasks for different sectors to be carried out simultaneously or in an overlapping manner (such as different stores to be written to the cache). Only the sectors that are involved with a store operation need to be powered up during a given command sequence.

Figure 5:
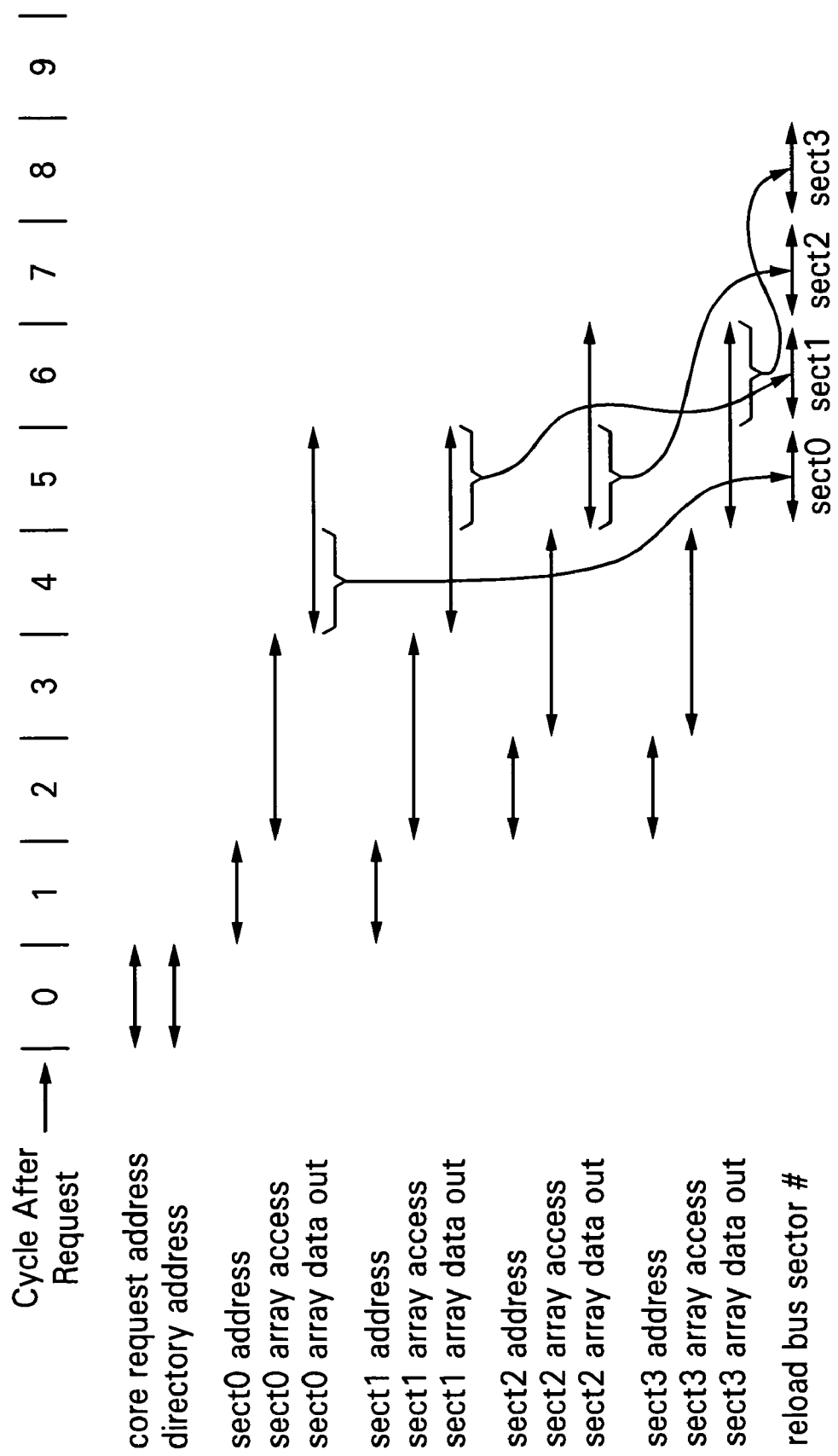
FIG. 5 is a timing diagram for the data output from the cache array to the requesting processor core for the cache structure of FIG. 4.

The timing of the output of L2 cache quadrant 52a is illustrated in FIG. 5. The core issues the request in cycle 0 with the directory address. Sector0 and sector1 both receive their enable signals and address in cycle 1, while sector2 and sector3 see their address in cycle 2. The data from the L2 quadrant is delivered to core 32a on the reload data bus at 32 bytes per cycle. The data from all four sectors propagates back across the L2 quadrant from left to right (crossing through the latch boundaries 54a and 54b) during cycles 4-6. During cycle 5, the data from the arrays labeled 00, 08, 10 and 18 are delivered to the core. During cycle 6 the data from the arrays labeled 20, 28, 30 and 38 are delivered to the core. During cycle 7 the data from the arrays labeled 40, 48, 50 and 58 are delivered to the core. During cycle 8 the data from the arrays labeled 60, 68, 70 and 78 are delivered to the core.

This physical layout allows for pipelining of the cache output in a manner that takes advantage of the differential latencies of the cache line sectors. Furthermore, by providing a unified cache with output pipelining, processing unit 30 significantly reduces overall load hit latency without the need for more expensive cache constructions. The performance gain may be further enhanced by using the faster wires available in physical design for the control signal from the core to the L2 controller and then out to the cache arrays as well as for output from the cache to the core. By designating these paths to use wires constructed of a premium metal which are up to 16 times the width and 16 times the speed of the smallest wires used on the chip, the designer dedicates the fastest wire resource to one of the most sensitive performance areas (L2 latency). These features result in a highly scalable design which keeps load hit latency low in spite of a large growth in cache size.

The unified cache structure for two directory slices provides a power advantage to the circuits by only having to build the large supporting quad dataflow structure once (as opposed to the prior art structure where the dataflow/cache was built once per directory slice). Also, by partitioning the cache quad into individual sectors, the L2 control for store operations only needs to enable the cache sector that the store is targeting, as opposed to the prior art which would cause all caches to light up.

Returning to FIG. 4, if the load or store request from core 32a misses the cache (i.e., the cache does not currently contain a valid copy of the memory block), then L2 controller 44a forwards the request to system memory via FBC 38. The data is retrieved from elsewhere in the memory hierarchy (e.g., from the L3 cache or system memory) and is subsequently input to the cache in a pipelined fashion, using merge flow circuits 58 located at the base of cache quad 52a. Merge flow circuits 58 are controlled by the cache arbiter of L2 controller 44a via a "Mrgflow_ctl" signal. Commands from the cache arbiter to the cache array (to output data) can overlap with commands for merge flow operations. For store requests that are L2 hits, the cache arbiter only activates the sector (or sectors) that contains store data. Consequently, two different stores that are directed to different sectors can be performed at the same time.

The read data from FBC 38 is pipelined for a given sector using eight 8-byte fabric busses and eight multiplexers. Each multiplexer has two fabric bus inputs, one from interleave bus A (ILVA) and one from interleave bus B (ILVB). The output of a given multiplexer is connected to an input line of one of the merge flow circuits 58, e.g., the two rightmost merge flow circuits 58 receive the output of the multiplexers whose inputs are designated for the first sector of a cache line, i.e., the first 32 bytes to be stored in the arrays labeled 00, 08, 10 and 18 ("ILVA_Byte00_data" and "ILVB_Byte00_data"), while the two leftmost merge flow circuits 58 receive the output of the multiplexers whose inputs are designated for the last sector of the cache line, i.e., the last 32 bytes to be stored in the arrays labeled 60, 68, 70 and 78 ("ILVA_Byte60_data" and "ILVB_Byte60_data"). Bus interleaving is scheduled by FBC 38 to avoid conflicts at each of the 8-byte multiplexers (the notation of "A" and "B" interleave busses is unrelated to the notation of "A" and "B" for the cache slices).

Figure 6:
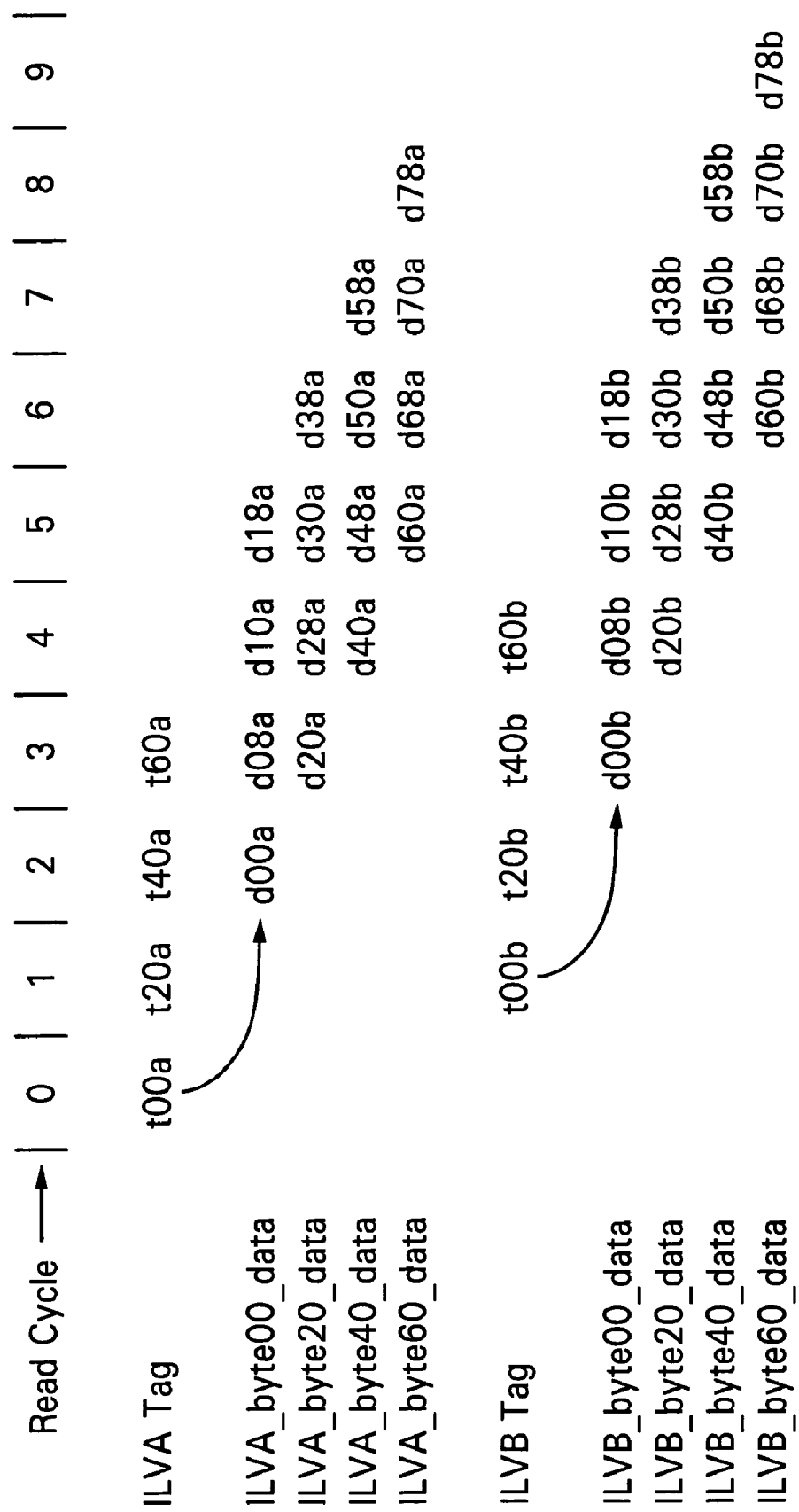
FIG. 6 is a timing diagram for receiving data at the merge flow circuits of FIG. 4 from the interleaved fabric bus.

The timing of the read data for a load or store miss is illustrated in FIG. 6. The address tags for four sectors (e.g., sectors 0, 1, 2, 3) being sent on interleave bus A ("IVLA tag") are transmitted over a tag bus during the first four cycles of the read operation (i.e., during cycles 0-3), and the address tags for four sectors being sent on interleave bus B ("IVLB tag") are also transmitted over four cycles on another tag bus, but one cycle behind the interleave bus A tags (i.e., during cycles 1-4). This tag information is used by L2 cache controller 44a to identify when data is arriving into the cache quad 52a and by the merge flow logic 58 to know which data to take. Data transmission begins in the third cycle on the IVLA_byte00 data bus, which sequentially transmits 32 bytes of data (d00a, d08a, d10a and d18a) over the time span of cycles 2-5. Transmission of the other interleave A data busses is staggered by one cycle, i.e., the IVLA_byte20 data bus sequentially transmits 32 bytes of data (d20a, d28a, d30a and d38a) over cycles 3-6, the IVLA_byte40 data bus transmits 32 bytes of data (d40a, d48a, d50a and d58a) over the time span of cycles 4-7, and the IVLA_byte60 data bus transmits 32 bytes of data (d60a, d68a, d70a and d78a) over the time span of cycles 5-8. Transmission of the interleave B data busses is one cycle behind the corresponding interleave A data bus, i.e., the IVLB_byte00 data bus transmits 32 bytes of data (d00b, d08b, d10b and d18b) over the time span of cycles 3-6, the IVLB_byte20 data bus transmits 32 bytes of data (d20b, d28b, d30b and d38b) over the time span of cycles 4-7, the IVLB_byte40 data bus transmits 32 bytes of data (d40b, d48b, d50b and d58b) over the time span of cycles 5-8, and the IVLB_byte60 data bus transmits 32 bytes of data (d60b, d68b, d70b and d78b) over the time span of cycles 6-9.

FIG. 6 shows the relationship of how 32-byte sectors might be scheduled on IVLA and IVLB. The data associated with two different tags (e.g., t00a versus t20a) may or may not carry data associated with the same 128-byte cache line.

Figure 7:
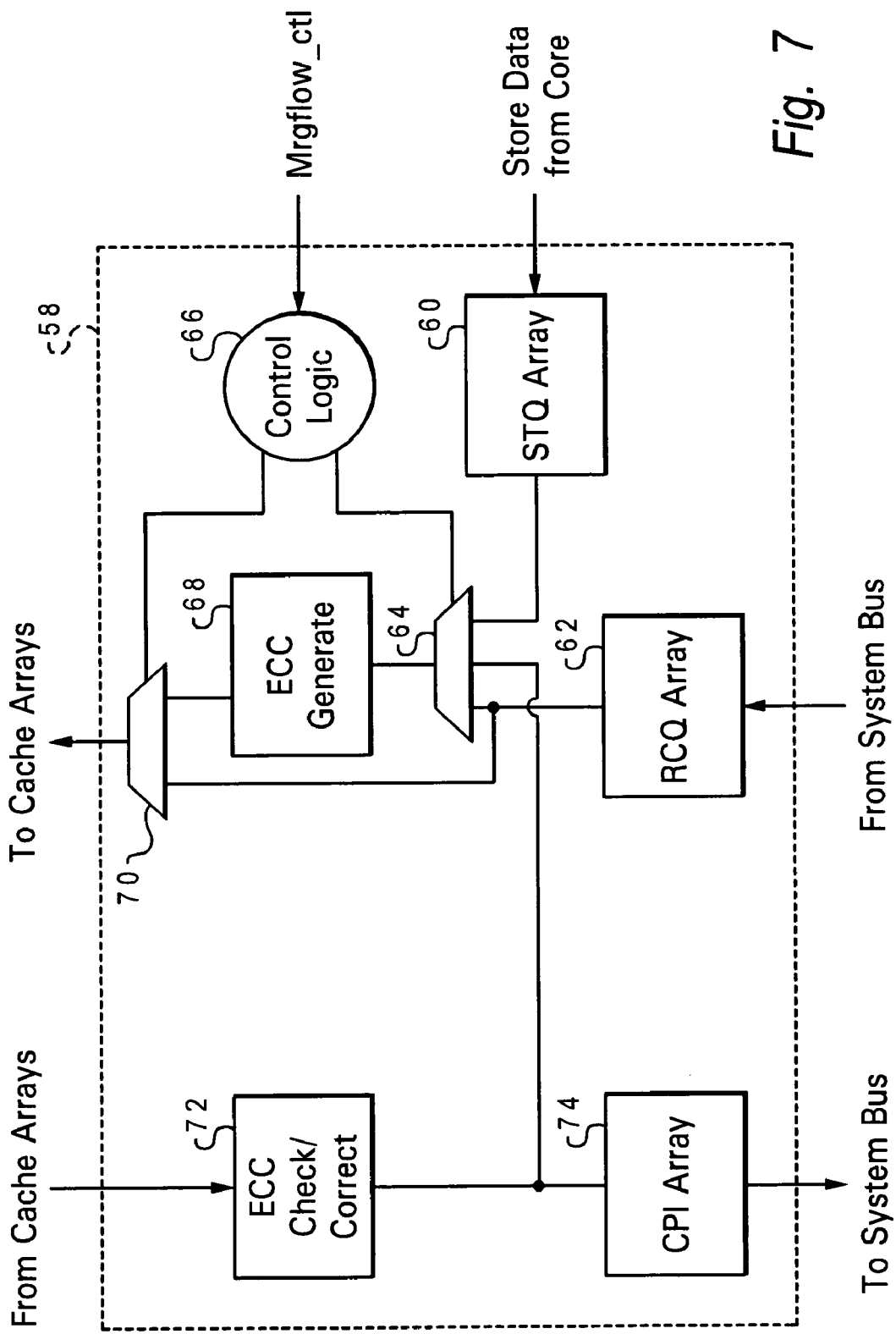
FIG. 7 is a schematic diagram of a circuit used for the merge flow of data in the L2 cache of FIG. 4.

Referring now to FIG. 7, the retrieved data from FBC 38 for a load or store miss is input to a read claim queue (RCQ) array 62 of merge flow circuit 58. The output of RCQ array 62 is connected to a first multiplexer 64 to process store misses. The select line of multiplexer 64 is connected to control logic 66 which parses the control signal from the L2 cache arbiter to pass the store miss data from RCQ array 62 on to an error-correction code (ECC) generator 68. The output of ECC generator 68 is one input to a second multiplexer 70, also controlled by control logic 66. RCQ array 62 is also connected directly to multiplexer 70 for moving load miss data into the cache array; the ECC generate can be bypassed since the fabric bus has already performed the error correction. Multiplexer 70 then transmits the read data to the cache arrays.

For a store operation, the store data from the core is held in a store queue array 60, whose output is connected to another input of multiplexer 64 and similarly propagates to the cache arrays via multiplexer 70. Store commands from the cache arbiter to the merge flow circuits within a given sector can again overlap, i.e., sending a second store command while earlier store data is being merged. In addition, the cache arbiter can initiate commands to have different sectors processing different store operations at the same time. For store hits, the cache arbiter only needs to activate the sector(s) that contain the store data (e.g., an 8-byte store to address 00 only needs to affect sector0). Stores can be collected and batch processed by controller 44a. The vertical (top/bottom) boundary 56 between the top two rows and the bottom two rows thus represents a cycle boundary for latching the merge flow data. If the store operation misses the cache and the congruence class is already full, a cache line must be evicted. In this case, the evicted cache line passes through an ECC check 72 and a cast-out/push/intervention (CPI) array 74 on its way to system memory.

Those skilled in the art will appreciate that the vertical bus structure of the L2 cache quads is generally provided for the merge flow maintenance (load misses, and stores), while the horizontal bus structure of the L2 cache quads is generally provided for reload (load hits).

Figure 8A:
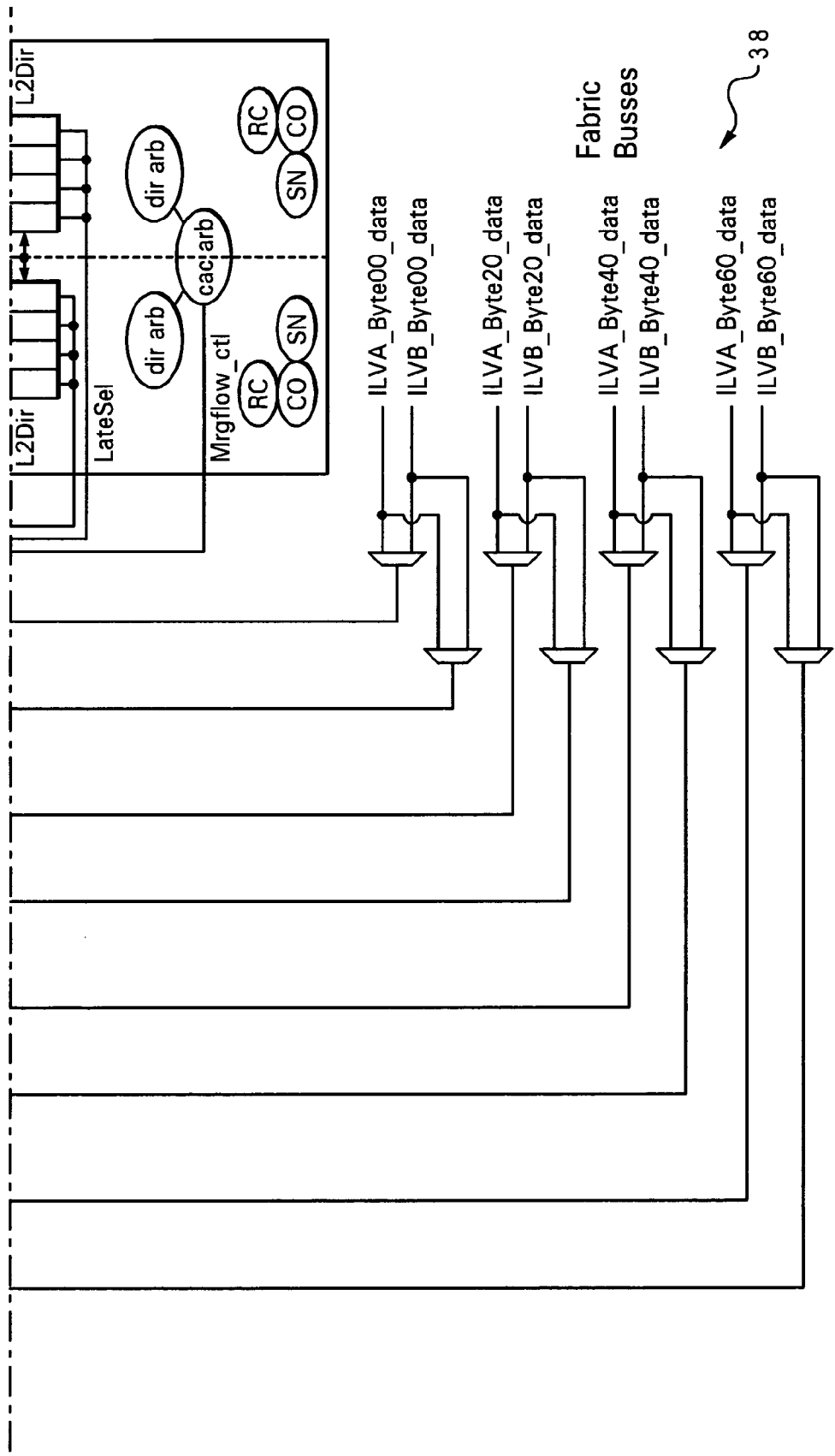
FIGS. 8A and 8B are block diagrams of another L2 cache memory having a sliced directory and unified cache array, constructed in accordance with an alternative embodiment of the present invention concerned with defect recoverability.
Figure 8B:
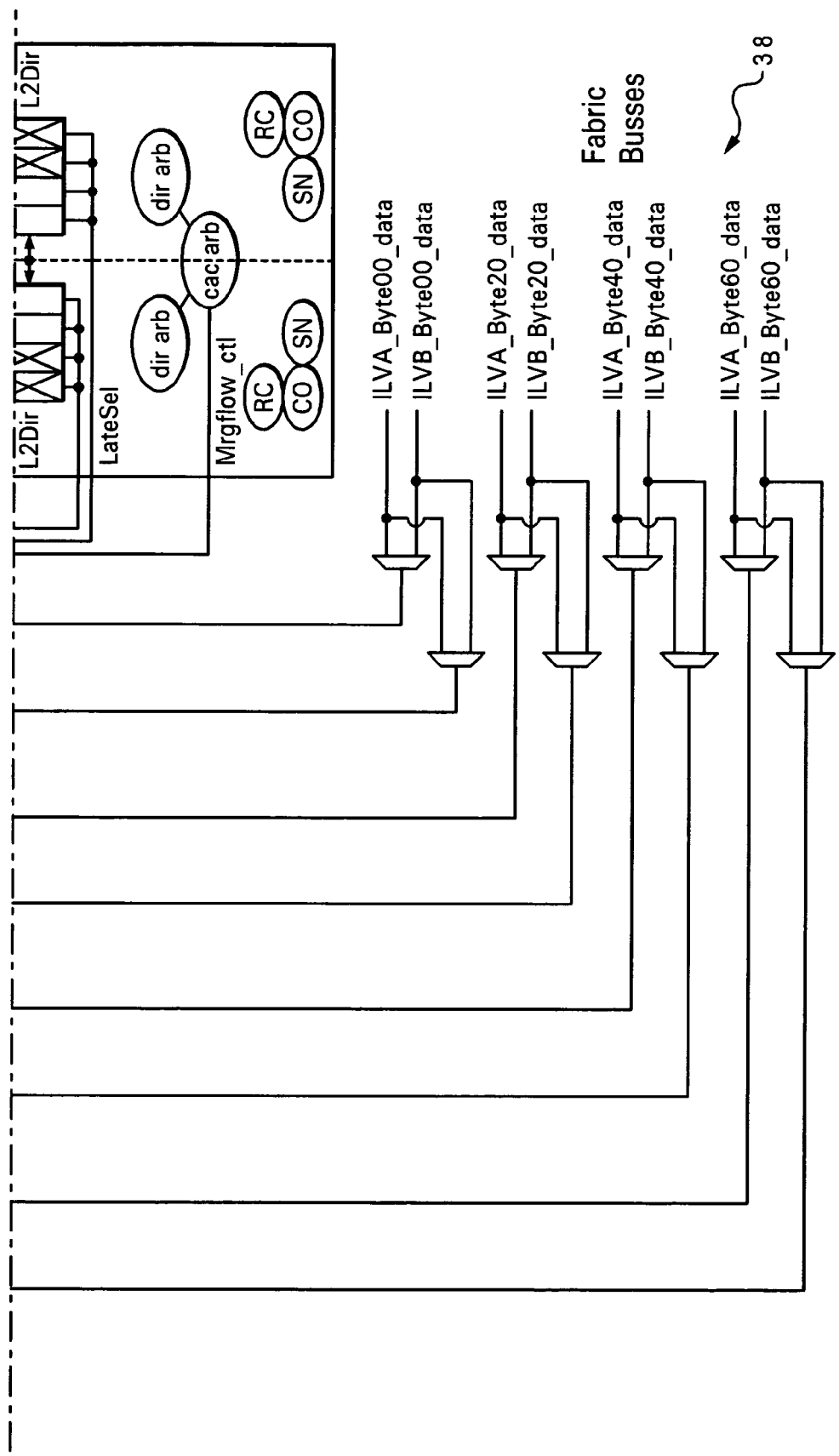

While the processing unit embodiment of FIG. 4 is favored for power conservation, the present invention further contemplates an embodiment which is favored for defect recoverability. This embodiment is shown in FIGS. 8A and 8B, which illustrate one L2 quadrant 52a' with its corresponding controller 44a'. L2 quadrant 52a' still has the same sector arrangement, that is, sector0 being located along the right side (lowest latency), and sector3 being located along the left side (highest latency), similar to the L2 quadrant 52a of FIG. 4. However, in the embodiment of FIG. 5, a given row of L2 quadrant 52a' is used for portions of both the A and B slices, that is, the set of eight cache ways in a given array are divided across both slices. The top row contains selected sectors of the first four members in the congruence class for both slices, i.e., A(0:3) and B(0:3), and the bottom row contains the remaining sectors of the first four members of both slice A and slice B. The second row from the top contains selected sectors of the last four members in the congruence class for both slices, i.e., A(4:7) and B(4:7), and the second row from the bottom contains the remaining sectors of the last four members of both slice A and slice B. The command lines from the directory slices in controller 44a' (LateSel) are accordingly routed to each row of L2 quad 52a', e.g., the select line for the first four members from either directory slice are routed to the top and bottom rows, while the select line for the last four members from either directory slice are routed to the two middle rows.

This construction facilitates partial utilization of the cache (a "half-good" mode) whenever a portion of the cache becomes unusable. In the example shown in FIG. 8B, at least one of the sectors corresponding to blocks A(4:7) and B(4:7) has become defective. The block(s) may have an original manufacturing defect or a defect that arose later from, e.g., stray radiation or electrostatic discharge. The defect may be discovered by array testing at power-on, or run-time logging of repeated ECC problems in a given physical array. Once the flaw is discovered, software can flush the L2 cache contents to memory, then direct controller 44a' to disable both rows associated with the defective block. While the example of FIG. 8B illustrates disabling the two middle rows, if the defect had occurred in one of the sectors corresponding to blocks A(0:3) and B(0:3) then the controller would disable the top and bottom rows.

In the example of FIG. 8B two rows are entirely disabled, which is useful for the situation wherein an address decode circuit is broken, affecting more than one member. For those situations where only a single member is defective, a slightly more complicated embodiment could be designed to disable only that member and salvage the cache with ⅞ capacity.

In this recoverability embodiment, it is preferable to utilize the cache eviction algorithm to effectuate the disabling of the defective rows. The eviction algorithm may be a least-recently used (LRU) or pseudo-LRU algorithm which allocates a cache block of the congruence class for eviction based on how recently or frequently that block has been accessed. The LRU logic, which resides in controller 44a', can include configuration bits or flags set by software to identify defective ways and prevent allocation of any blocks in those ways.

In this manner, if a defect occurs in the cache, the cache can continue operations with full directory access and all control queues available while only reducing the size of the cache by half (or less), instead of disabling an entire cache slice. This approach is particularly beneficial for certain technical applications which take advantage of queue size.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, while the invention is particularly useful for larger caches, it is more generally applicable to any type of memory hierarchy having one or more caches, including non-uniform memory access (NUMA) structures. It is therefore contemplated that such modifications can be made without departing from the spirit or scope of the present invention as defined in the appended claims.

What is claimed is:

1. A method of operating a cache memory, comprising:
   determining that the cache memory does not have currently valid entries corresponding to first and second requested memory values; and
   loading the first and second requested memory values respectively into first and second cache lines of the cache memory by receiving separate portions of the first requested memory value from a first data bus over a first time span of successive clock cycles and receiving separate portions of the second requested memory value from a second data bus over a second time span of successive clock cycles, wherein the first time span at least partially overlaps with the second time span, the first and second cache lines are spread across different cache sectors of the cache memory, the cache sectors have different output latencies, and the separate portions of a given requested memory value are loaded sequentially into the corresponding cache sectors based on the cache sectors' respective output latencies.

2. The method of claim 1 wherein:
- a first input line is used for loading both a first byte array of the first cache line and a first byte array of the second cache line;
- a second input line is used for loading both a second byte array of the first cache line and a second byte array of the second cache line; and
- said receiving of the separate portions of the first and second memory values is interleaved between the first and second data busses.

3. The method of claim 1 wherein the first data bus is one of a plurality of data busses in a first data bus set, and the second data bus is one of a plurality of data busses in a second data bus set.

4. The method of claim 3 wherein said loading further includes successively receiving a first plurality of address tags on a first address bus to identify which portions of the first requested memory value are being received from the first data bus set, and successively receiving a second plurality of address tags on a second address bus to identify which portions of the second requested memory value are being received from the second data bus set.

5. The method of claim 1 wherein:
- each of the requested memory values is 32 bytes;
- said receiving of the separate portions of the first requested memory value occur over four successive cycles with an 8-byte portion received each cycle; and
- said receiving of the separate portions of the second requested memory value occur over four successive cycles with an 8-byte portion received each cycle.

6. The method of claim 1 wherein a given cache sector has at least one associated merge flow circuit to receive portions of a requested memory value and input the portions into the cache sector.

* * * * *